(12) United States Patent
Saito

(10) Patent No.: US 6,594,340 B2
(45) Date of Patent: Jul. 15, 2003

(54) ROTARY ANODE TYPE X-RAY TUBE APPARATUS

(75) Inventor: Shin Saito, Otawara (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/050,176

(22) Filed: Jan. 18, 2002

(65) Prior Publication Data

US 2002/0097838 A1 Jul. 25, 2002

(30) Foreign Application Priority Data

Jan. 22, 2001 (JP) .................................... 2001-012698

(51) Int. Cl.⁷ ................................................ H01J 35/10
(52) U.S. Cl. ........................................ 378/130; 378/141
(58) Field of Search ............................... 378/130, 131, 378/144, 119, 143, 199, 141

(56) References Cited

U.S. PATENT DOCUMENTS

| | | | |
|---|---|---|---|
| 4,562,587 A | 12/1985 | Gerkema et al. | |
| 5,541,975 A | 7/1996 | Anderson et al. | |
| 6,011,829 A | 1/2000 | Panasik | 378/130 |
| 6,249,569 B1 * | 6/2001 | Price et al. | 378/130 |
| 6,366,642 B1 * | 4/2002 | Andrews | 378/130 |
| 6,435,207 B1 * | 8/2002 | Mewes et al. | 137/487.5 |

FOREIGN PATENT DOCUMENTS

| | | |
|---|---|---|
| EP | 0 477 868 | 4/1992 |
| EP | 1 164 822 | 12/2001 |

* cited by examiner

Primary Examiner—Drew A. Dunn
Assistant Examiner—Irakli Kiknadze
(74) Attorney, Agent, or Firm—Pillsbury Winthrop LLP

(57) ABSTRACT

In a rotary anode type X-ray tube apparatus, a rotary anode target model X-ray pipe is received in housing. Housing is coupled by cooler device to supply a coolant in the housing. Anode target is fixed to a rotary cylinder, which is rotatably supported by a stationary shaft. The stationary shaft is provided with an inner hollow space for guiding the coolant. The coolant guided in the housing is split into two flowing streams, and one of the streams is introduced into the space for cooling of stationary shaft.

7 Claims, 7 Drawing Sheets

ROTARY ANODE TYPE X-RAY TUBE APPARATUS

CROSS-REFERENCE TO RELATED APPLICATIONS

This application is based upon and claims the benefit of priority from the prior Japanese Patent Application No. 2001-012698 filed Jan. 22, 2001, the entire contents of which are incorporated herein by reference.

BACKGROUND OF THE INVENTION

1. Field of the Invention

This invention relates to a rotary anode type X-ray tube apparatus, and more particularly to a rotary anode type X-ray tube apparatus having a cooling structure, which can improve a cooling efficiency of a rotary anode type X-ray tube received in a housing.

2. Description of the Related Art

In a rotary anode type X-ray tube apparatus, a rotary anode type X-ray tube is received in a housing, and the rotary anode type X-ray tube comprises a cathode for generating an electron beam, an anode target for emitting X-rays upon irradiation of the electron beam, a rotating mechanism for rotatably supporting the anode target, and a vacuum envelope for enclosing the cathode, the anode target, and the rotating mechanism.

FIG. 1 shows a conventional rotary anode type X-ray tube apparatus. In FIG. 1, numeral 41 denotes a housing, and a rotary anode type X-ray tube is enclosed in the housing 41. A coolant such as insulating oil is filled in a space between the housing and the rotary anode type X-ray tube.

In the rotary anode type X-ray tube 41 shown in FIG. 1, there are enclosed a cathode 44 for generating an electron beam, an anode target 45 for emitting X-rays upon irradiation of the electron beam, a rotating mechanism 46 for rotatably supporting the anode target 45. The rotating mechanism 46 comprises a rotary cylinder 47 to which the anode target 45 is fixed, a stationary shaft 48 for rotatably supporting the rotary cylinder 47, and dynamic pressure type bearings.

In the dynamic pressure type bearings, helical grooves of herringbone patterns are formed on the surface or surfaces of the stationary shaft 48 and/or the rotational structure 47, and a liquid metal lubricant such as gallium or gallium alloy is applied to the helical grooves and a gap space between the stationary shaft 48 and the rotational structure 47. A stator coil 49 for generating a rotating magnetic field is provided outside the vacuum envelope 43 and disposed around the rotary cylinder 47.

A cooler device 50 is located outside of the housing 41 and comprises a heat exchange unit, a pump unit and so on. A coolant outlet path such as an outlet pipe P0 couples the cooler device 50 to the housing 41 to supply a coolant from the cooler device 50 to the housing, and a coolant inlet pipe such as an inlet pipe Pi also couples the housing 41 to the cooler device 50 to return the coolant from the housing 41 to the cooler device 50.

In the apparatus shown in FIG. 1, the insulating oil as the coolant which is heated by the rotary anode type X-ray tube 42 is supplied from the housing 41 to the cooler device 50 via the outlet pipe P0 and the insulating oil which has been cooled in the cooler device 50 is also supplied to housing 41 from the cooler device 50 via the inlet pipe Pi so that the insulating oil is circulated in a circulating path as shown by arrow Y.

In an operating mode, the stator coils 49 applies the rotating magnetic field to the rotary cylinder 47 of the rotating mechanism 46 to rotate the rotary cylinder 47 so that the anode target 45 is rotated. The electron beam generated from the cathode 44 is accelerated by a high voltage between the cathode 44 and the anode target 45 and is impinged on the rotated anode target 45 so that X-rays are emitted from the rotated anode target 45. The X-rays pass through a radiation window W1 provided on the vacuum envelope 43 and a radiation window W2 provided on the housing 41 and are guided outside of the housing 41.

Heat is generated from the anode target 45, stator coils 49, the dynamic pressure type slide bearing between the stationary shaft 48 and the rotary cylinder 47, and so on, and is transmitted to the insulating oil circulated between the cooler device 50 and the housing 41. Thus, the insulating oil absorbing the heat cools the X-ray tube.

The dynamic pressure type bearing has advantages of low noise, low vibrations, and long life due to small rotational friction. However, a shearing force is applied to the liquid metal lubricant in rotation of the rotary cylinder and a shearing energy is transferred to the liquid metal lubricant so that the liquid metal lubricant is heated due to the shearing energy and a temperature of the dynamic pressure type bearing is increased. Thus, a diffusion reaction is prompted between the liquid metal lubricant and a bearing material of the rotary cylinder and the stationary shaft. As a result, it may be impossible to constantly maintain a stable rotation of the rotary cylinder. Accordingly, a method of cooling the bearing is employed in the conventional X-ray apparatus, in which a coolant space is provide in the stationary shaft constituting the rotating structure and the insulating oil is supplied to the coolant space to cool the bearing section of the stationary shaft.

There will be described a conventional rotary anode type X-ray tube apparatus having a stationary shaft of a bearing with reference to FIG. 2, in which a coolant space is formed. In FIG. 2, same numerals denote same parts or members in FIG. 1, and a detailed description thereof will be omitted.

A hollow space 51 for circulating a coolant such as an insulating oil to cool a stationary shaft 48 is formed in the stationary shaft 48 in an axial direction and a pipe 52 is so arranged to extend in the hollow space 51 in the axial direction. The pipe 52 is coupled to the inlet pipe Pi at a bottom end 52A thereof and is extended along the hollow space 51, and a top end 52B of the pipe Pi is closely faced to the inner bottom of the pipe Pi.

In the configuration shown in FIG. 2, the insulating oil passing through the inlet pipe Pi is guided in the pipe 51 and flows in the pipe 51 as shown by arrow Y1. The insulating oil is supplied from the opening of the top end 52B to the flow space and path between the pipe 51 and the stationary shaft 52. Then, the insulating oil flows in the flow path and outlets in the space of the housing 41, as shown in FIG. 2. The inlet pipe Pi, the pipe 51, and the flow path between the pipe 51 and the stationary shaft 52 constitutes a part of the circulating coolant path for guiding the insulating oil, which cools the bearing to maintain the temperature of the bearing in a predetermine temperature range.

Thereafter, the insulating oil flowed from the flow path in the stationary shaft 52 into the space in the housing 41 flows to the stator coils 49 and the vacuum envelope 43 to absorb heat generated from the stator coils 49 and the vacuum envelope 43 and is supplied to the cooler device 50 through the outlet pipe P0.

In the conventional rotary anode type X-ray tube apparatus, the coolant hollow space is provided in the stationary shaft constituting the rotating mechanism to absorb heat generated from the bearing, and so on. In this construction, an inner diameter of the stationary shaft in the coolant hollow space can not be set to be relatively large, because the stationary shaft has a relatively small outer diameter and the stationary shaft must have a sufficient mechanical strength. If the stationary shaft has a small inner diameter to have a sufficient mechanical strength, a pressure loss is produced in the coolant flow space or path in the stationary shaft, and a flow rate of the coolant circulating in the apparatus is lowered and the circulating amount of the coolant is decreased in the apparatus. Thus, a cooling efficiency of cooling the stator coils, the vacuum envelop and so on is lowered due to the lowering of the circulating amount of the coolant.

There is an improved method of increasing a cooling efficiency, in which a pumping ability of pumping the coolant is increased in the cooling device. To increase the pumping ability, it is required to design the device to have a large size. Thus, the cooling device becomes high in cost. Although, if the pumping ability is increased, the cooling efficiency may be set to a high level and a viscosity may be large due to the excessive cooling of the bearing and the liquid metal lubricant, and lowering the temperature of the liquid metal lubricant to an unexpected one. Thus, a rotation torque may become unsuitably large within a range of a rotation rate required for the anode target, thus requiring more power to be supplied to the stator coils.

BRIEF SUMMARY OF THE INVENTION

An object of the present invention is to provide a rotary anode type X-ray tube apparatus which can effectively absorb heat generated from a bearing without lowering an amount of coolant flowing through a housing of the apparatus.

According to the invention, there is provided an X-ray tube apparatus comprising:
an X-ray tube including;
a rotary anode target;
a cathode configured to generate electrons to the anode target to cause the anode target to emit X-rays;
a rotary cylinder coupled to the anode target:
a stationary shaft configured to rotatably support the rotary cylinder, the stationary shaft having an opening and a hollow space communicating with the opening;
a dynamic pressure type bearing provided between the stationary shaft and the rotary cylinder; and
a vacuum envelope configured to receive the anode target, the stationary shaft, the rotary cylinder, and the bearing;
a housing configured to receive the X-ray tube, in which a coolant is filled;
a cooler device configured to cool the coolant and circulate the coolant between the cooler device and the housing:
a coolant splitter configured to split the coolant supplied from the cooler device into coolant streams in the housing, one of the coolant streams being guided in the hollow space of the stationary shaft.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A rotary anode type X-ray apparatus according to an embodiment of this invention will be explained with reference to FIGS. 3 to 5.

Figure 3:
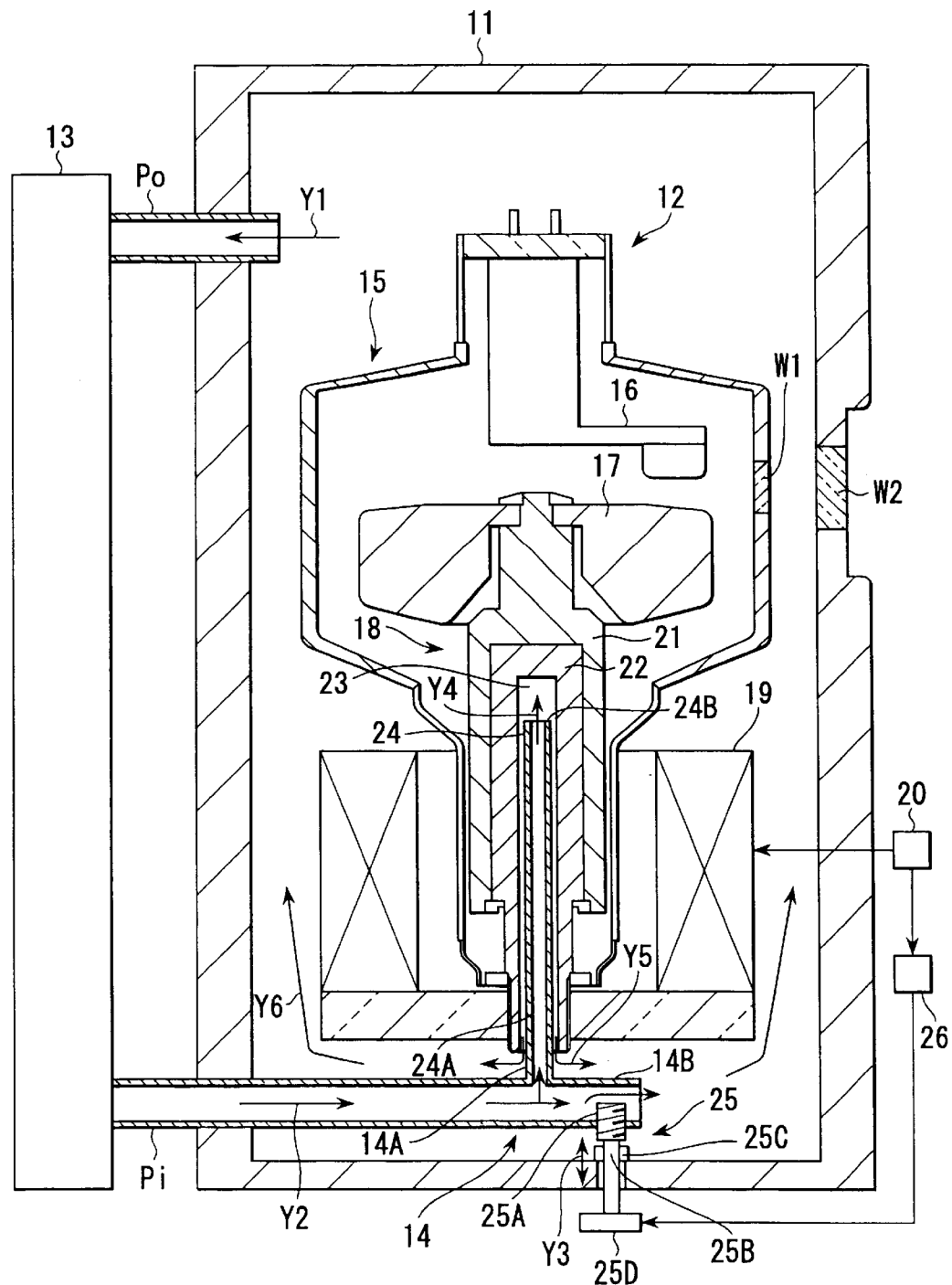
FIG. 3 is a cross sectional view schematically showing a rotary anode type X-ray tube apparatus according to one embodiment of the invention.
Figure 4:
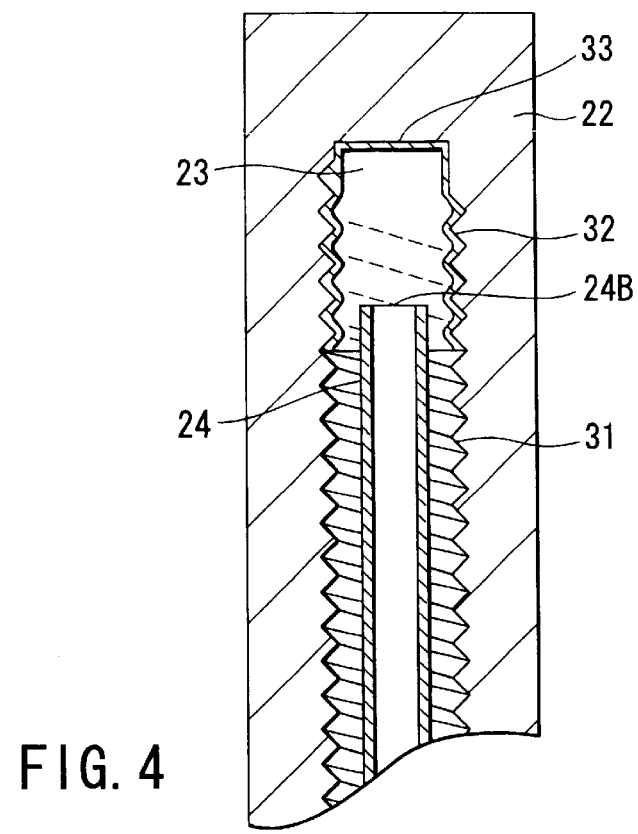
FIG. 4 is a cross sectional view showing an internal structure of a combination of a stationary shaft and a pipe shown in FIG. 3, which has a coolant space and a coolant-circulating path formed therein.

In FIG. 3, numeral 11 denotes a housing in which a rotary anode type X-ray tube apparatus 12 is received. A coolant, such as insulating oil, is filled in a gap space between the housing 11 and the rotary anode type X-ray tube 12. A cooler device 13 for supplying the coolant is independently arranged to supply the coolant to the housing 11. The cooler device 13 includes a heat exchanger (not shown), a pump unit (not shown) and so on. The cooler device 13 is provided with a coolant outlet path, such as a coolant supply pipe P0, coupled to the housing 11. Thus, the coolant, i.e., the insulating oil, is output from an upper space of the housing 11 to the cooler device 13 through the coolant supply pipe Po, as shown by the arrow Y1, to transfer heat generated from the rotary anode type X-ray tube 12. The cooler device 13 is also provided with another coolant supply path, such as a coolant inlet pipe P0, fixed to a lower section of the housing 11 and is extended in the housing 11. In the housing 11, the inlet pipe Pi is coupled to coolant splitting unit 14. The splitting unit 14 includes first and second pipe sections 14A, 14B to distribute the insulating oil into two orthogonally flowing paths.

The rotary anode type X-ray tube 12 received in the housing 11 includes a vacuum envelope 15, a cathode 16 for generating an electron beam, an anode target 17 for emitting X-rays upon irradiation of the electron beam, and a supporting mechanism for rotatably supporting the anode target 17. Dynamic pressure type slide bearings that may be so called as liquid film bearings or metal-lubricated bearings are provided between a rotary cylinder 21 and a stationary shaft 22. In the dynamic pressure type slide bearing, herringbone patterns are formed on the stationary shaft 22 and/or the rotary cylinder 21, and a liquid metal lubricant of gallium or an alloy of gallium alloy is applied to the herringbone patterns and a bearing gap between the stationary shaft 22 and the rotary cylinder 21. The stationary shaft 22 has a hollow space 23 for defining a coolant path, in which a coolant supply pipe 24 is located along an axial direction of the stationary shaft 22. The coolant supplied to the supply pipe 24 is guided into the hollow space and delivered to the space in the housing 11 through an opening of the stationary shaft 22.

The supply pipe 24 has an inlet 24A and an outlet 24B. The inlet 24A is coupled to the first pipe section 14A of the splitting unit 14, and the outlet 24B is located at the top of the hollow space of the stationary shaft 22. A flow regulation unit 25 for regulating the flow rate of the insulating oil is mounted on the second pipe section 14B. The flow regulation unit 25 comprises an aperture adjustment part 25A for adjusting the aperture of the flowing path in the second pipe section 14B, a screw shaft 25B coupled to the aperture adjustment part 25A and provided on the housing 11 for moving the adjustment part 25A in a direction normal to the coolant flowing path to change the flow rate in the second pipe section 14B, a bellow seat 25C provided around the screw shaft 25B, for covering the screw shaft 25B in a liquid tight fashion, and a turn handle 25D, located outside the housing 11, coupled to the screw shaft 25B. The screw shaft 25C is rotated when turn handle 25D is turned, so that the adjustment part 25A is moved upward or downward, as shown by arrow Y3. Thus, an aperture is increased or decreased so that the flow rate of insulating oil flowing in the second pipe section 14b is changed. In this flow rate adjustment, the second flow rate of insulating oil flowing in the first pipe section 14A is increased and decreased in inverse relation with the increase and decrease of the first flow rate in the second pipe section 14B.

In the configuration described above, the insulating oil flowing through the inlet pipe Pi is divided into tow flowing streams at the splitting unit 14. One of the streams is guided into the supply pipe 24 as shown in the arrow Y4, is flowed out from the outlet 24B of the pipe 24 and rapidly applied to the inner bottom surface of the stationary shaft 22 in the coolant space 23. The insulating oil stream is guided from the space to the hollow path between the supply pipe 24 and the stationary shaft 22 and flows into the housing space of the housing 11 as shown by the arrow Y5. The other stream of the insulating oil distributed in the splitting unit 14 is guided in the second pipe section 14B, passes through the aperture adjustment part 25A, and flows out from the opening of the second pipe section 14B into the housing space in the housing 11.

The streams of the insulating oil flowing from the coolant space 23 and the second pipe section 14B flows together in the housing 11 as shown by the arrow Y6 and absorb heat generated from the stator coils 19 and the vacuum envelope 15. Thus, the insulating oil is circulated into the cooler unit 13 through the outlet pipe P0.

The structure of the stationary shaft 22 will be described in detail with reference to FIG. 4, which is an enlarged view of the stationary structure 22. In FIG. 4, same numerals denote same parts or members in FIG. 3, and a detailed description thereof will be omitted. A coating layer 32 made of gold or gold alloy is formed on the inner surface of the stationary shaft 22, which defines the hollow inner space, to protect the inner surface against corrosion.

In the above described apparatus, at a start of an operation mode, power is supplied to the stator coils 19 to generate a rotating magnetic filed around the rotary cylinder 21. Thus, the rotating magnetic field rotates the rotary cylinder 21 of the rotating mechanism 18 and the anode target 17 is rotated. In this state, the electron beam generated from the cathode 16 is impinged on the anode target 17 and the X-rays are emitted from the anode target 17. The X-rays are outputted to the outside of the apparatus through the X-ray window W1 provided on the vacuum envelope 15 and the X-ray window W2 provided on the housing 11.

The insulating oil flowing in the cooler space 23 of the stationary shaft 22 absorbs heat generated from the bearing to cool the bearing and insulating oil flowing along the surface of the vacuum envelope 13 in the housing 11 also absorbs heat generated from the anode target and the stator coils 19 to cool the stator coil 19 and the X-ray apparatus.

Figure 5:
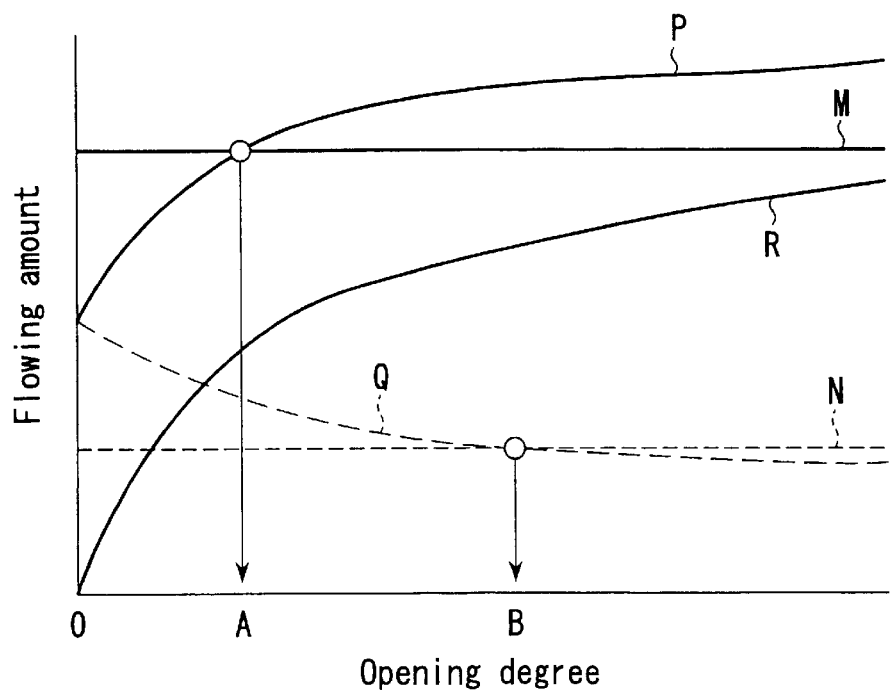
FIG. 5 is a graph showing a relation between a flowing amount of a coolant flowing through the coolant space and the coolant path shown in FIG. 4 and an opening degree of an aperture which is set in accordance with a method of adjusting the flowing amount of the coolant in the rotary anode type X-ray tube apparatus shown in FIG. 3.

Next, the function of the flow regulation unit 25 for regulating the flow rate of coolant will be describe with reference to FIG. 5. In a coordinate system shown in FIG. 5, the abscissa axis denotes an opening degree of the aperture adjustment part 25A in the second pipe section 14B of the splitting unit 14 and the ordinate axis denotes a flowing amount of the coolant, wherein the origin 0 corresponds to a state of closing the second pipe section 14B to shut the flowing path of the coolant in the second pipe section 14B. A line P shows the total amount of coolant supplying to the inlet pipe Pi, a line Q shows a relation between the flowing amount of the coolant in the first pipe section 14A or the supply pipe 24 and the opening degree in the second pipe section 14B, and a line R denotes a relation between the flowing amount of the coolant in the second pipe section 14B and the opening degree in the second pipe section 14B. A line M also shows a flowing amount of the coolant required for cooling the X-ray tube apparatus, and a line N shows a flowing amount required for cooling the bearing.

In the splitting unit 14, if the opening degree of the aperture adjustment part 25A in the second pipe section 14B is set to be zero, all coolant supplied to the inlet pipe Pi is guided to the first pipe section 14A and the supply pipe 24. Thus, the total amount of the coolant supplied to the inlet pipe Pi is substantially equal to the flowing amount of coolant flowing through the first pipe section 14A.

If the splitting unit 14 is adjusted to increase the opening degree of the aperture adjustment part 25A in the second pipe section 14B, the amount of coolant flowing in the second pipe section 14B is increased and the amount of coolant flowing in the first pipe section 14A is decreased. In this state, pressure losses are balanced in the first and second pipe sections 14A, 14B and the required amounts of the coolant are supplied to the first and second pipe sections 14A, 14B. The total amount of the supplied coolant corresponds to the sum of the required amounts of the coolant supplied to the first and second pipe sections 14A, 14B.

Additionally, the total flowing amount of the coolant required for cooling the X-ray tube apparatus is determined in accordance with the cooling ability of the cooler device and a rating of the X-ray tube. The flowing amount of the coolant required for cooling the bearing is determined in accordance with the rotation rate of the anode target, and the shape and material of the bearing. Generally, the flowing amount of the coolant required for cooling the bearing is smaller than the total flowing amount of the coolant required for cooling the X-ray tube apparatus. The opening degree of the second pipe section 14B is adjusted within a preferable range of opening degree points A and B shown in FIG. 5.

The actual opening degree is determined within the preferable range of opening degree points A and B based on experiment and calculation in consideration of the coolant path structure and properties of the coolant. The actual opening degree is preferably so determined as to set a bearing temperature having a sufficient margin at a usual rotating rate of the anode target, which can decrease a reaction rate between the bearing surface and the liquid metal lubricant to prevent the X-ray tube life from being shortened and can prevent the bearing from being overcooled, which increases a rotation torque.

If the rotation rate of the anode target is constant, the opening degree of the aperture adjustment part in the second pipe section may be so fixed or set as to flow a proper amount of the coolant to the coolant space in the stationary shaft, at the time of assembling the X-ray tube. If the rotation rate of the anode target is varied, the opening degree of the aperture adjustment part in the second pipe section may be controlled in accordance with the rotation rate of the anode target, based on measuring data relating to the total amount of the coolant required for cooling the X-ray tube and the flowing amount required for cooling the bearing, both of which have been previously measured, and may be adjusted to supply a proper amount of the coolant to the coolant space in the stationary shaft.

The flow rate regulation unit 25 may include an electrically-actuated valve which can control an opening degree of the aperture adjustment part in response to an electric signal supplied to the electrically-actuated valve. In a preferable modified embodiment, a current measuring unit 26 measures a current supplied to the stator coil 19 shown in FIG. 3 and detects a rotation rate of the anode target to generate a rotation signal. The electrical actuating valve of the flow rate regulation unit 25 is preferably controlled in response to the rotation signal. There will be described an operation of a rotary anode type X-ray tube apparatus according to the modified embodiment of the invention, with reference to FIG. 6.

Figure 6:
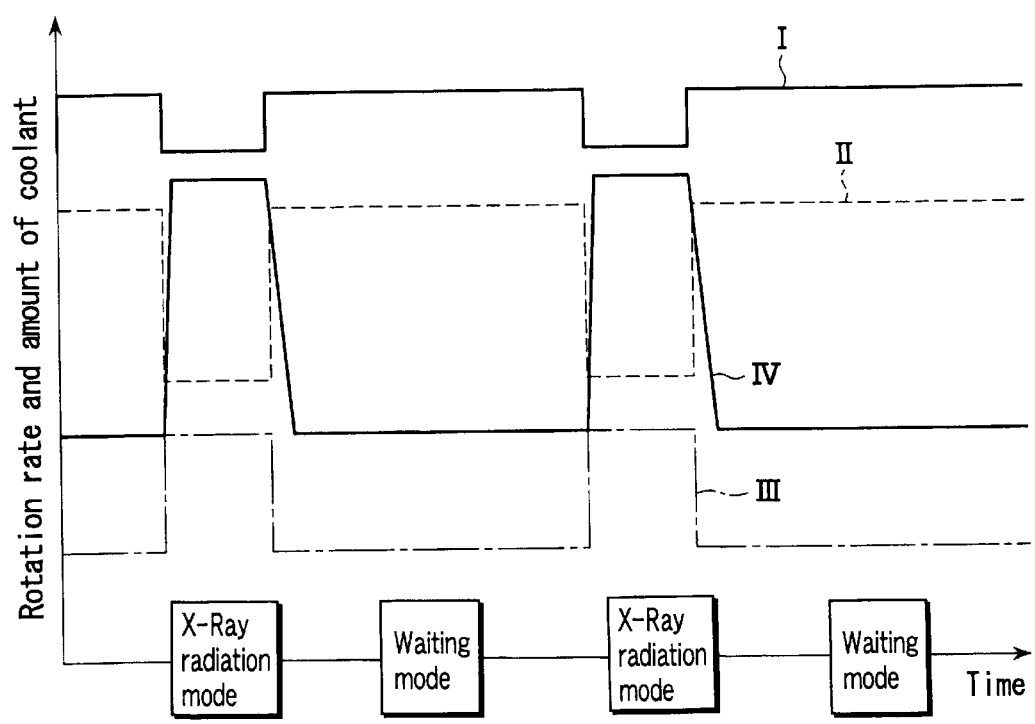
FIG. 6 shows graphs showing a relationship between operation modes, rotation rate of the anode target, and flow rates of the coolant in the rotary anode type Xray tube apparatus shown in FIG. 3.

FIG. 6 shows a rotation rate of the rotary anode target, flowing amount of the coolant and the operation mode in the rotary anode type X-ray tube apparatus shown in FIG. 3. The vertical axis shows a rotation rate of the rotary anode target and flowing amount of coolant, and the transverse axis shows an operation mode of the X-ray tube. In FIG. 6, line I shows a total flowing amount of the coolant supplied from the cooler device 13 to the housing 11, the second lien II shows a flowing amount of the coolant passing through the second pipe sections 14B into the stationary shaft, a third line III also shows a flowing amount of the coolant supplied to the stationary shaft 22 through the first pipe sections 14A, and a fourth line IV shows a rotation rate of a rotary anode target 17.

As shown in FIG. 6, the rotary anode target 17 is rotated at a relatively low rotation rate in a waiting mode, because the electrons are not emitted from the cathode 16. In contrast, in an X-ray radiation mode, electrons are emitted from the cathode 16, and the electrons impinge on the rotary anode target 17 so that the rotary anode target 17 is heated. Thus, the rotary anode target is rotated at a relatively high rotation rate. One of the waiting and radiation modes is detected as the current signal by the current measuring unit 26, and the current signal is supplied to the flow regulation unit 25. The flowing amount of the coolant passing through the second pipe sections 14B is controlled depending on the rotation rate of the rotary anode target 17 by the flow regulation unit 25 and the coolant flowing through the second pipe sections 14B is adjusted. In the waiting mode, the rotary anode target 17 is rotated at the relatively low rotation rate as shown by line IV, and the aperture in the second pipe sections 14B is fully opened by the flow regulation unit 25, because it is not required to supply the relatively large amount of coolant into the stationary shaft 22 to sufficiently cool the bearing section on the stationary shaft 22. Therefore, a resistance in the flow path of the second pipe sections 14B is small, and a relatively large amount of coolant passes through the second pipe sections 14B as shown by line II and a relatively large total amount of coolant is supplied from the cooler device 13 to the housing 11, as shown by line I. In contrast, in the X-ray radiation mode, rotary anode target 17 is rotated at a relatively high-rotation rate, as shown by line IV. Therefore, the flow regulation unit 25 decreases the aperture area in the second pipe sections 14B and the flow resistance of the second pipe sections 14B is increased so that the flowing amount of the coolant passing through the second pipe sections 14B is decreased, as shown by line II. The total amount of the coolant supplied from the cooler device 13 is also decreased as shown by line I. With an increase of flow path resistance of the second pipe sections 14B, the flowing amount of coolant supplied to the first pipe sections 14A is increased as shown by line III. As a result, stationary shaft 22 is sufficiently cooled by the sufficient amount of coolant.

The period of the X-ray radiation mode is long here, and, for around 1 minute, the period of the wait mode is tens of minutes or several minutes. As described above, the stationary shaft 22 can be properly cooled in the X-ray radiation mode so that it is possible to prevent the bearing section from being excessively heated, and prevent the liquid metal lubricant from reacting with the bearing material of the stationary shaft 22.

Figure 1:
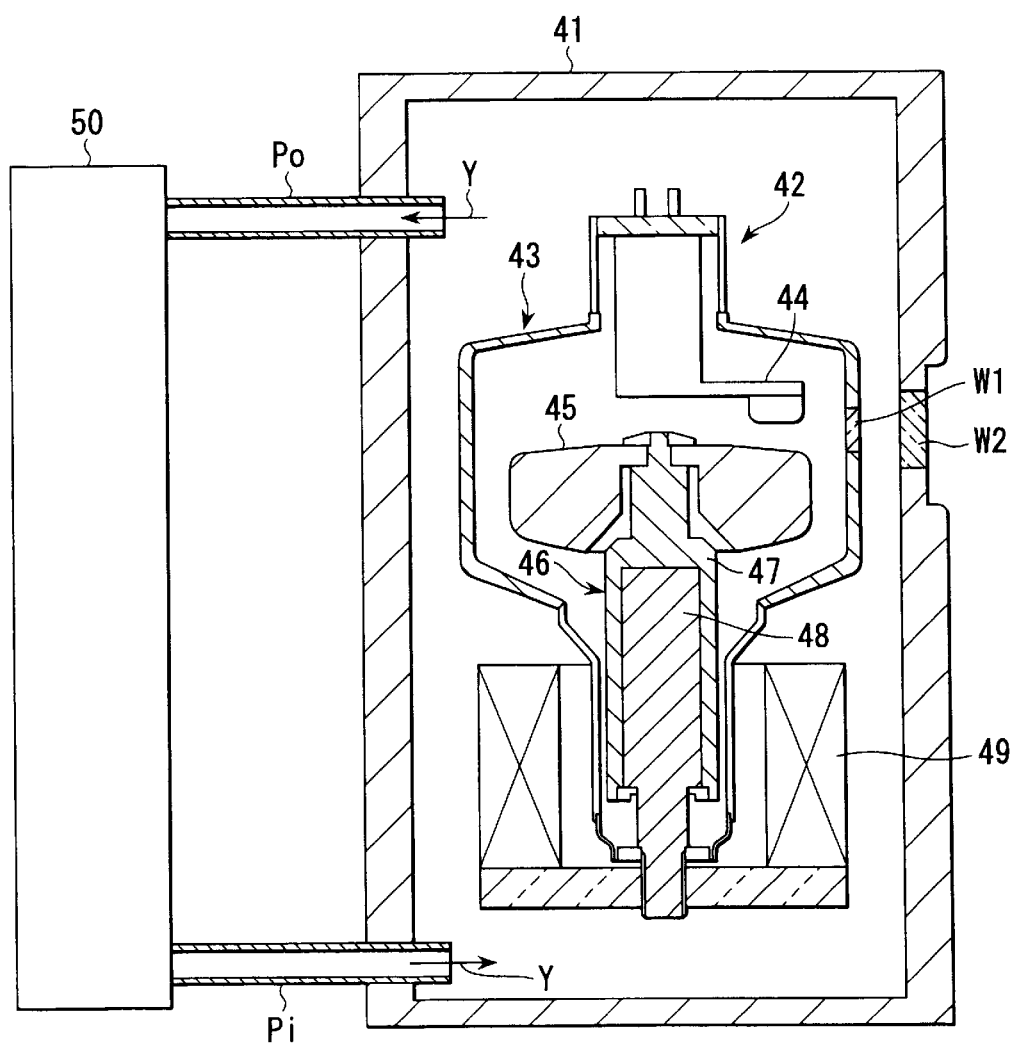
FIG. 1 is a cross sectional view schematically showing a conventional rotary anode type X-ray tube apparatus.
Figure 2:
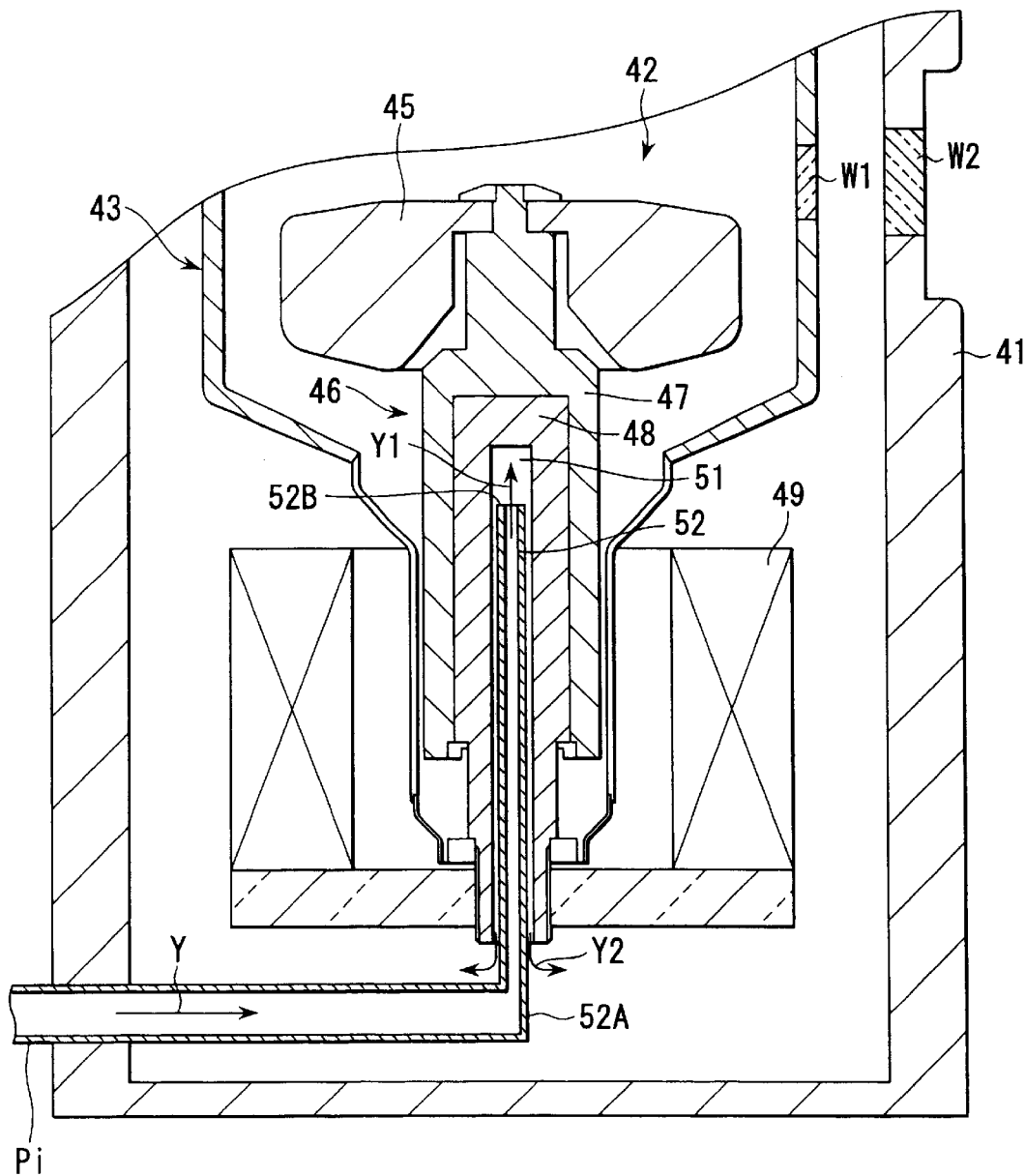
FIG. 2 is a partial cross sectional view schematically showing a part of a conventional rotary anode type X-ray tube apparatus which is provided with a coolant hollow space formed in a stationary shaft of the apparatus.

According to the embodiment of the present invention, the flow of the coolant is branched and guided into the two paths. Thus, the flow paths, each having an individual pressure loss, are arranged in parallel, and constitute a parallel flow path having a total pressure loss smaller than that of the series flow path in which the coolant passes through the inner space of the stationary shaft and is guided into the housing in the conventional cooling system as shown in FIG. 2.

Therefore, the total flow amount of the coolant can be increased, and the heat of the whole X-ray tube can be cooled off surely. Because the configuration shown FIG. 3 is simple, the manufacturing cost of the system can be reduced in comparison with the system for improving a pump ability of the cooler device. In addition, the bearing sections can be cooled surely because the flow path of the coolant is defined as the coolant space 23 in the stationary shaft 22. In this configuration, the flow rate regulation unit 25 can adjust the flowing amount of the coolant passing through the space 23 so that the bearing section is maintained at a proper temperature.

In a modification as shown in FIG. 5, the spiral groove 31 is formed in the inner surface of the stationary shaft 22, which defines the coolant space 23. This structure provides a large surface area and a turbulence effect of the insulating oil so that a cooling rate is improved.

In addition, a coating layer 32 such as a gold layer or gold alloy layer can be formed on an inner surface of the stationary shaft 22. Thus, even if water is used as the coolant, which easily corrodes the metal, corrosion of the inside of the stationary shaft 22 is prevented, so that its life can be extended. The coating layer 32 may be formed on the whole surface facing space 23, the bottom surface part 33 or the bottom surface 33 and the surface region around the bottom surface part 33 to which the coolant is applied.

In the embodiment of the present invention, the coolant stream is branched into two paths. However, the coolant stream may be branched into three or more paths to apply the coolant to the parts or regions to be cooled. In addition, the coolant stream may be branched into two coolant paths and the coolant path may be further branched.

In addition, in the embodiment, the flow rate regulation unit is provided in the coolant path, which directly leads the coolant into the housing. The flow rate regulation unit may be provided in the diverged path, which leads the coolant in the stationary shaft to cool the bearing section.

There will be described rotary anode type X-ray apparatuses according to modified embodiments of the invention with reference to FIG. 7 and FIG. 8.

Figure 7:
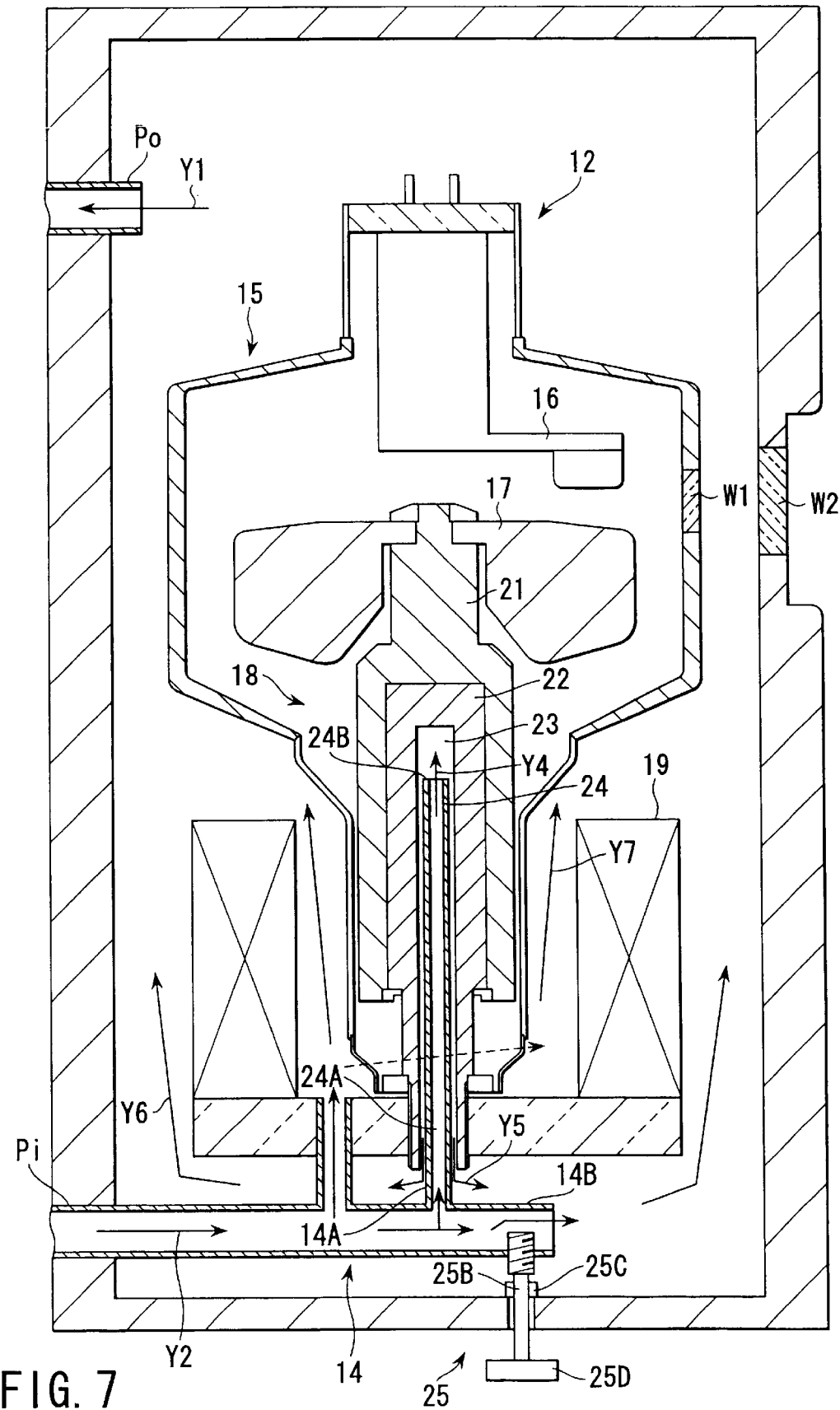
FIG. 7 is a cross sectional view schematically showing a rotary anode type X-ray tube apparatus according to a modified embodiment of the invention.

In the rotary anode type X-ray apparatus shown in FIG. 7, the splitting unit 14 is provided with a third pipe section 14C in addition to the second pipe sections 14A, 14B. One of the streams is guided into the supply pipe 24 as shown in the arrow Y4, is flowed out from the outlet 24B of the pipe 24 and rapidly applied to the inner bottom surface of the stationary shaft 22 in the coolant space 23. The insulating oil stream is guided from the space to the hollow path between the supply pipe 24 and the stationary shaft 22 and flows into the housing space of the housing 11 as shown by arrow Y5. The second stream of the insulating oil distributed in the splitting unit 14 is guided in the second pipe section 14B, passes through the aperture adjustment part 25A, and flows out from the opening of the second pipe section 14B into the housing space in the housing 11. Furthermore, the third stream of the insulating oil distributed in the splitting unit 14 is guided in the third pipe section 14C and introduced into a space between the stator coil 19 and the X-ray tube 12. Therefore, the stator coil 19 is mainly cooled by the third insulating oil stream.

Figure 8:
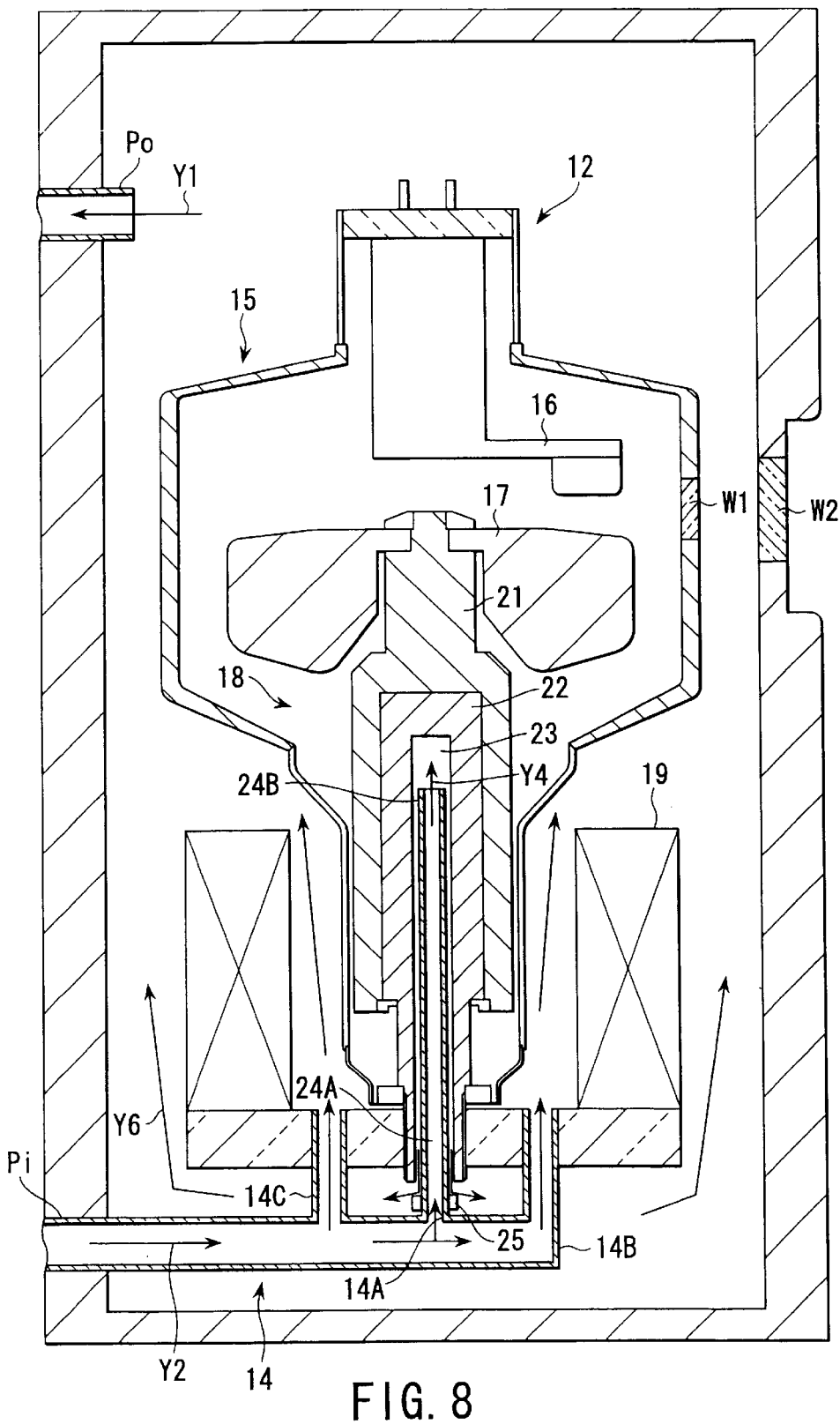
FIG. 8 is a cross sectional view schematically showing a rotary anode type X-ray tube apparatus according to another modified embodiment of the invention.

In the rotary anode type X-ray apparatus shown in FIG. 8, the splitting unit 14 is also provided with a third pipe section 14C in addition to the second pipe sections 14A, 14B. In this construction, one of the streams is guided into the supply pipe 24 as shown by arrow Y4, is flowed out from the outlet 24B of the pipe 24 and rapidly applied to the inner bottom surface of the stationary shaft 22 in the coolant space 23. The insulating oil stream is also guided from the space to the hollow path between the supply pipe 24 and the stationary shaft 22 and flows into the housing space of the housing 11 as shown by arrow Y5. The second and third streams of the insulating oil distributed in the splitting unit 14 is guided in the second and third pipe sections 14B, 14C, and introduced into a space between the stator coil 19 and the X-ray tube 12. Therefore, the second and third insulating oil streams mainly cool the stator coil 19. In this construction shown in FIG. 8, the flow regulation valve 25 may be provided on the first pipe section 14A.

In the rotary anode type X-ray apparatus shown in FIGS. 7 and 8, the stator coil 19 can be effectively cooled.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An X-ray tube apparatus comprising:

an X-ray tube including;
  a rotary anode target;
  a cathode configured to generate electrons to the anode target to cause the anode target to emit X-rays;
  a rotary cylinder coupled to the anode target;
  a stationary shaft configured to rotatably support the rotary cylinder, the stationary shaft having an opening and a hollow space communicating with the opening;
  a dynamic pressure type bearing provided between the stationary shaft and the rotary cylinder; and
  a vacuum envelope configured to receive the anode target, the stationary shaft, the rotary cylinder, and the bearing;
a housing configured to receive said X-ray tube, in which a coolant is filled;
a cooler device configured to cool the coolant and circulate the coolant between the cooler device and the housing;
a coolant splitter configured to split the coolant supplied from the cooler device into coolant streams in the housing, one of the coolant streams being guided directly into the hollow space of the stationary shaft.

2. The X-ray tube apparatus according to claim 1, wherein another one of the coolant streams is directly guided into a space between the housing and the X-ray tube in the housing.

3. The X-ray tube apparatus according to claim 1, further comprising:
  a flow regulation mechanism, provided in the stream, configured to regulate a flow rate of the coolant stream.

4. The X-ray tube apparatus according to claim 3, further comprising:
  a sensor unit configured to sense a rotation rate of the anode target to generate a sensing signal; and
  a control unit configured to control the flow regulation mechanism, the flow regulation mechanism regulating the flow rate in accordance with the sensing signal.

5. The X-ray tube apparatus according to claim 1, wherein the stationary shaft is provided with an inner surface defining the hollow space, a spiral groove being formed on the inner surface.

6. The X-ray tube apparatus according to claim 1, wherein the stationary shaft is provided with an inner surface defining the hollow space, a coating layer of gold or gold alloy is formed on the inner surface.

7. The X-ray tube apparatus according to claim 6, further comprising:
  a pipe section, inserted in the opening and extending in the hollow space of the stationary shaft, configured to guide the coolant stream into the hollow space and apply the coolant stream to a part of the inner surface, on which a coating layer of gold or gold alloy is formed.

* * * * *